Oct. 26, 1965   J. A. McDOUGAL   3,213,704
ZERO BACKLASH GEARING
Filed June 10, 1963
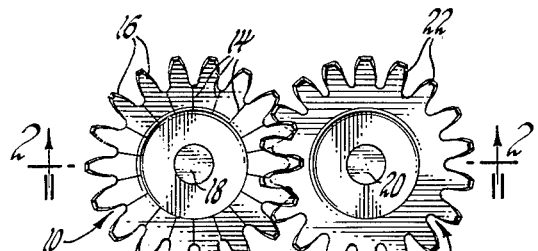
Fig.1
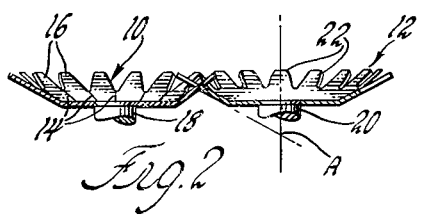
Fig.2
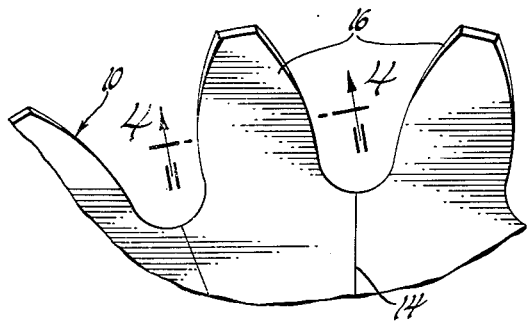
Fig.3
Fig.4
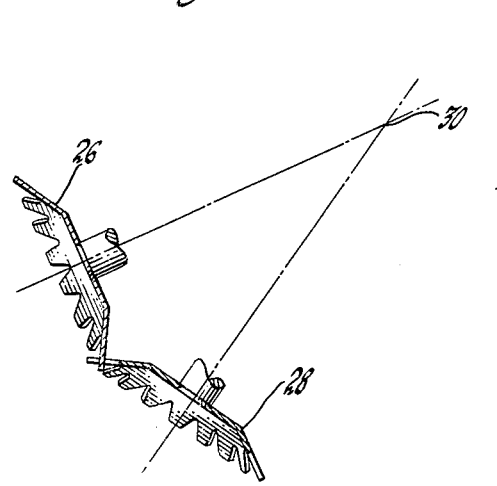
Fig.5
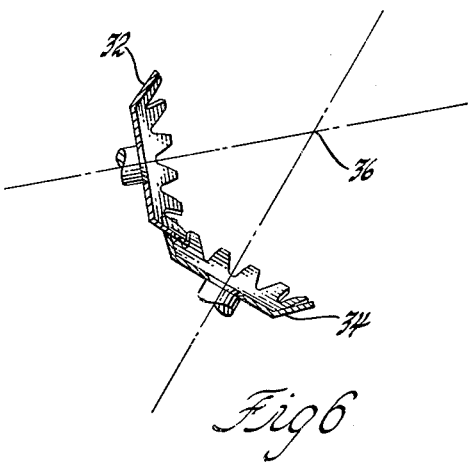
Fig.6
INVENTOR.
John A. McDougal
BY
George E. Johnson
ATTORNEY United States Patent Office 3,213,704
Patented Oct. 26, 1965

3,213,704
ZERO BACKLASH GEARING
John A. McDougal, Flint, Mich., assignor to General Motors Corporation, Detroit, Mich., a corporation of Delaware
Filed June 10, 1963, Ser. No. 286,839
4 Claims. (Cl. 74—449)

This invention relates to gearing and more particularly to gearing for transmitting torque without backlash.

In operating or driving instruments such as gages it is often important that the transmission of torque to an instrument be smooth and devoid of any irregularity such as occurs in prior devices despite the fact that only a slight backlash may be present in such devices. A suitable and improved drive arrangement should not only be free of backlash but should also be low in cost and adaptable to high volume production.

Accordingly, an object of the present invention is to provide a drive for an instrument which drive is devoid of backlash while in operation, is low in cost, and which may readily be produced in quantity.

A feature of the present invention is a drive including two engaged and dished gears each of which is resiliently distorted and flexed by the engagement and in the general direction of its own radius. Another feature is a drive including two engaged gears at least one of which is frusto-conical or dished and is resiliently distorted and flexed radially and also which is substantially unyielding tangentially in transferring torque. Another feature is a drive including two frusto-conical gears of resilient sheet plastic having involute gear teeth in mesh and distorted radially by engagement pressure between the two gears.

These and other important features of the invention will now be described in detail in the specification and then pointed out more particularly in the appended claims.

In the drawings:

FIGURE 1 is a plan view of two frusto-conical gears resiliently engaged and representing one embodiment of the present invention;

FIGURE 2 is a sectional view looking in the direction of the arrow 2—2 of FIGURE 1;

FIGURE 3 is an enlarged view of a portion of one of the gears shown in FIGURE 1;

FIGURE 4 is a sectional view taken at 4—4 in FIGURE 3;

FIGURE 5 is a cross-section of a drive which is a modification of the drive shown in FIGURES 1 and 2; and FIGURE 6 is a sectional view of a third modification.

In FIGURE 1, two dished or frusto-conical gears 10 and 12 are shown in engagement. These gears are similar except that the gear 10 has radial slits 14 giving an increased resilience to the teeth 16 of that gear in a radial direction; that is, in a direction toward the axis or shaft 18. The gear 12, if desired, could also be provided with such slits but in the illustrated example, gear 12 is left without them. The gear 12 is mounted on a shaft 20 which is parallel with the shaft 18. Because of the omission of the slits in the gear 12 the teeth 22 of the latter are of less flexibility in the radial direction but with the gears mounted as shown in FIGURES 1 and 2 and assuming that the gear 10 is the driver the teeth 16 and 22 are engaged in such a manner that the pressure of engagement flexes the engaging teeth a slight distance toward their respective axes 18 or 20. While disengaging, the consecutive teeth are released and flex outwardly into their normal shape. Because of this yielding action of the teeth there is no clearance between the engaging teeth at the pitch diameter and, accordingly, there is no backlash in the driving of one gear by the other. The flexing of the engaging teeth is small and is therefore not illustrated in the drawings.

The gears 10 and 12 may be made of spring steel but for low load applications they are preferably made of plastic material such as nylon or Delrin. The essential characteristic is that the sheet material of each gear or tooth yields toward the axis of that gear in engaging the other gear but is substantially unyielding in a tangential direction. FIGURE 3 shows how each tooth is preferably of an involute profile and the frusto-conical construction of each gear is in a form which includes a circle or the pitch diameter of each gear and a point on the axis of each gear such as the point A in FIGURE 2. Each tooth, being flat, is characterized by a tangential stiffness permitting effective torque transmission and it is preferable that the edges of each tooth be rounded as shown at 24 in FIGURE 4. This rounding prevents one tooth riding up on the engaged teeth of the other gear.

In FIGURE 5, two similar gears 26 and 28 are shown so mounted that their axes intersect at a point 30. It is to be noted that in this arrangement the conical configuration of each of the gears converges toward the axis intersection. The teeth, of this construction, flex toward their respective axes because of the pressure of engagement.

The modification of FIGURE 6 is similar to that of FIGURE 5 except that the conical construction of each of the two gears 32 and 34 converges in a direction away from the point of intersection 36 of the axes of the two gears. In any of these modifications or in a case wherein only one gear is frusto-conical, the resilient sheet material of the frusto-conical gear is distorted radially in maintaining engagement with the other gear and this eliminates all backlash between the gears.

It should be noted that the axes of a drive arrangement as described herein need not be in the same plane although they are so disclosed in the drawings and also that high tolerances of manufacture are not essential. The firm and two point contact of one gear with the other is continuous so that zero backlash is inherent in the operation. The tangential stiffness of the teeth permits each tooth to transmit torque firmly while the elasticity of the gear material in a plane radial to that gear permits the tooth to deflect and thus avoid backlash and binding. Thickness of the teeth may be modified to form a uniform strength cantilever if such a design appears desirable.

I claim:

1. A drive including two gears of thin sheet material, each of said gears having a series of peripheral teeth extending in the form of a frusto-cone, those of said gears in engagement being distorted and flexed radially by pressure of the said engagement.

2. A drive including two frusto-conical gears having flat peripheral teeth of thin material, the axes of said gears being parallel, and at least one of said gears being distorted and flexed radially by pressure of engagement with the teeth of the other.

3. A drive including two gears, at least one of said gears being dished with peripheral teeth integrally formed of thin resilient sheet material, said teeth extending outwardly and at an acute angle with the axis of said one gear, a portion of said one gear being distorted radially by pressure of engagement of teeth of said one gear with teeth of the other of said gears, and the teeth of each of said gears being substantially unyielding in a tangential direction in the interest of firm torque transmission.

4. A drive including two gears, each of said gears including a series of involute teeth extending around its periphery, the series of teeth of one of said gears being of resilient material and extending in the form of a frusto-cone, said one gear being distorted and flexed radially by pressure of engagement of opposite sides of one of its teeth with teeth of the other gear, each of the teeth of said one gear being relatively wide along its pitch diameter and while in engagement with the other gear being clear of the root diameter of the other gear teeth, the arrangement being such that no backlash exists between the two gears, and the teeth of the other of said gears being substantially unyielding tangentially in effecting firm torque transmission.

References Cited by the Examiner

UNITED STATES PATENTS

| 1,470,170 | 10/23 | Kail | 74—449 |
| 2,313,444 | 3/43 | Lamb | 74—461 |
| 2,572,334 | 10/51 | Guibert | 74—461 |

DON A. WAITE, *Primary Examiner.*